United States Patent [19]

Schendan

[11] Patent Number: 4,596,488
[45] Date of Patent: Jun. 24, 1986

[54] JOINT CONNECTOR

[76] Inventor: David J. Schendan, 13754 Mango Dr., #214, Del Mar, Calif. 92014

[21] Appl. No.: 568,696

[22] Filed: Jan. 6, 1984

[51] Int. Cl.$^4$ ............................ G09F 1/12; F16B 7/00
[52] U.S. Cl. ..................................... 403/402; 403/295
[58] Field of Search ............... 403/401, 402, 294, 295, 403/381

[56] References Cited

U.S. PATENT DOCUMENTS

| | | | |
|---|---|---|---|
| 2,371,493 | 3/1945 | Aschinger | 403/401 X |
| 3,425,721 | 2/1969 | Agee | 403/294 |
| 3,534,490 | 10/1970 | Herbert | 403/401 X |
| 3,736,684 | 6/1973 | Grad | 403/295 X |
| 4,405,255 | 9/1983 | Wallace | 403/402 |

Primary Examiner—Andrew V. Kundrat
Attorney, Agent, or Firm—Frank D. Gilliam

[57] ABSTRACT

An improved connector for joining and locking together a pair of abutting members. Each of the members have at least a shallow groove on each end thereof. The groove has an open surface extending longitudinally therealong. The width of the groove along the bottom surface is larger than the opening. The connector matingly engages the shallow grooves whereby the members are abutted and locked into place. The locking of the connector to the members is provided by the use of a resilient deformable joining key engaging grooves of a smaller dimension, pivotable tabs with protrusions engaging apertures in the surface of the shallow grooves opposite the groove opening or plugs insertable partially through the connector into apertures in the shallow grooves opposite the opening.

13 Claims, 14 Drawing Figures

JOINT CONNECTOR

BACKGROUND OF THE INVENTION

1. Field of the Invention

This invention relates generally to an arrangement of joining members together in an abutting locked relationship, particularly in the picture frame art.

2. Description of the Prior Art

U.S. Pat. No. 3,534,490 by inventor Donald P. Herbert teaches picture frame construction by use of one or two locking joints at each joinder which engages slots or channels at each end of the members to be joined. The locking joints are slightly smaller in dimension than their corresponding mating groove in the members for ease of insertion therein. The locking joints, when in position, are locked to the joined members by screws, shims, wedges or the like.

U.S. Pat. No. 3,736,684 by inventor Peter P. Grad teaches angled fastener means for joining abutting picture frame members not unlike those taught in U.S. Pat. No. 3,534,490 above. The fastening members snap into the locking grooves after the frame members are abutted into position. The fastening members are rectangular in cross-section and have a width slightly greater than the width of its receiving groove opening and a thickness or depth slightly less than the depth of the groove. The fastening members are constructed of rigid material, such as a phenolic plastic.

These prior art joints when properly executed are often difficult and time consuming to make, since individual frame members must be held tightly in aligned positions relative to one another while the locking joints or fastening members are secured to the frame members or installed by driving them into the frame member grooves. These fastening systems more often than not, especially when used by do-it-yourselfers, provide a loose rather than the desired tight abutting relationship of the joined frame members, the frame members are split when the screw, shims, wedges or the like are installed for the purpose of locking, the groove entrance wall are distorted by the forcing of the joining keys thereon resulting in damage to the frame members, a loose abutting joint and the lack of sufficient friction between the joining key and the groove surface to maintain the key in its desired position for maintaining the frame members in their tight abutting relationship during the life of the completed frame.

A successful, simple and inexpensive framing system avoiding the shortcomings and disadvantages of the existing frame systems has not been available until the emergence of the present invention.

SUMMARY OF THE INVENTION

In accordance with the present invention a readily assembled and disassembled frame is provided with great strength and rigidity by the use of a plurality of side members in combination with simple joining and locking means at the corners between the abutting frame members.

In constructing a frame by the use of the present invention each side member is provided with a slot or channel which has a larger bottom surface width than its upper opening width located least on each end thereof. An "L" shaped joining key configured to mate with the slot or channel is slipped into the slots or channels of the adjoining side members, thus bringing the side members together in their proper abutting relationship. Because the end of each side members are beveled, their abutting end relationship forms a miter joint. Once the joining keys are installed in the slots or channels and the side members are in their proper abutting relationship, either the resiliency of the forming key being slightly larger in cross-section than the slots or channels is forced into the slots or channels locks the abutting members in place or other types of locking means associated therewith firmly locks the abutting members in place. At this point the side members are firmly secured together to form a picture frame or the like.

The joining key locking means may include frusto conic protrusions engaging similar shaped openings or apertures in the bottom surface of the slot. The protrusions are formed as an integral part of the tapered end of the joining key and is pivotable therewith within the slot for protrusion/opening engagement or the protrusion can take the form of a plug insertable partially through the housing key and into the opening. As aforementioned, the joining key is constructed of a resilient material and formed slightly wider than the slot or channel whereby the forming key deforms when inserted into the slot and continues to bear against the slot walls providing a locking force thereagainst. The principle requirement for this type of friction locking means is that the joining key be more resilient than the frame members with which it is to be used.

To insure a proper abutting of the side members when a joining key/protrusion/opening combination is employed, the opening is spaced slightly further from the corner than the protrusion. Thus when the protrusion is forced into the opening a continual force is present holding the abutting side members together. The protrusion members are length segmented to allow for distortion when forced into the slightly offset openings.

Various advantages and features of novelty which characterize the invention are pointed out with particularity in the claims annexed hereto and forming a part hereof. However, for a better understanding of the invention, its advantages and objects attained by its use, reference should be had to the drawings which forms a further part hereof, and to the accompanying descriptive matter, in which there is illustrated and described preferred embodiments of the invention.

BRIEF DESCRIPTION OF THE DRAWINGS

Referring now to the drawings wherein like reference numerals represent like parts or elements throughout the Figures.

DESCRIPTION OF THE FIRST PREFERRED EMBODIMENT

Figure 1:
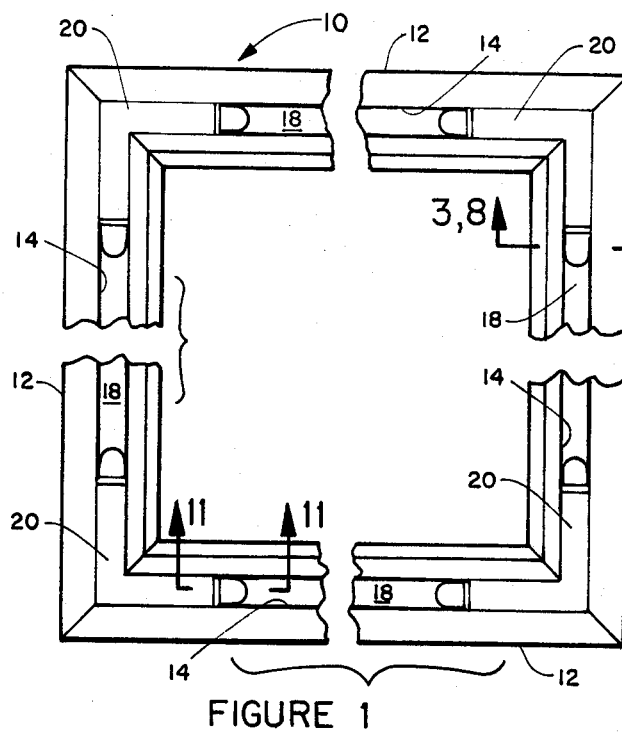
FIG. 1 depicts a rear view of a first rectangular picture frame embodying the invention.
Figure 2:
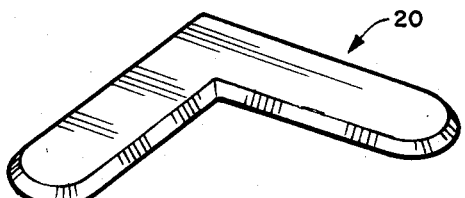
FIG. 2 is a perspective view of a first embodiment of the joining key of the invention.
Figure 3:
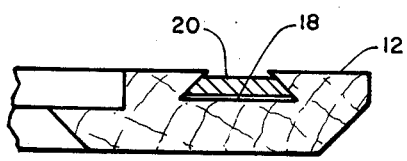
FIG. 3 is a view of FIG. 1 taken along line 3,8—3,8.

Referring now to FIGS. 1-4, FIG. 1 is the rear surface of a picture frame assembly 10 employing the invention for the joining together side frame members. The side frame members 12 are alike in configuration. Each side frame member 12 has a shallow groove 14 through its rear surface. The shallow groove 14 may run the length of the side member or may begin at the corner and terminate a selected distance therefrom. As can be seen in FIG. 1, when a pair of side frame members 12 are mated at their mitered ends into their intended positions. The shallow grooves 14 are aligned and form an "L" around the corners. As can be seen in FIG. 3, the shallow groove 14 is wider at its inner bottom or closed surface 18 than at its opposite open surface. The cross-section of the shallow groove 14 is shown as substantially trapezoidal. The joining key 20, shown in FIG. 2, is generally "L" shaped and has substantially the same cross-sectional configuration as the shallow groove 14, however, the joining key 20 is formed slightly larger in its cross-sectional diameter than the shallow groove 14, the purpose of which is for frictional locking therein which is hereinafter described in more detail. The joining key 20 detail. The joining key 20 is made of either material resilient to a greater degree than the side frame members 12 so that it can be deformed cross-sectionally when inserted into the slot or any combination of degree of resiliency and thickness to enable the joining key, when deformed or bowed upon insertion into the shallow groove 14, so as to apply sufficient outward pressure against the wall of the shallow groove 14 to maintain the side frame members 12 in an abutted relationship for an indefinite period of time.

DESCRIPTION OF THE SECOND PREFERRED EMBODIMENT

Figure 6:
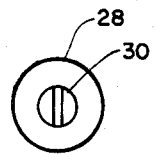
FIG. 6 is a view taken along line 6, 7—6, 7 of FIG. 5.
Figure 7:
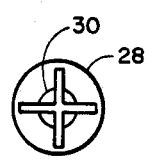
FIG. 7 is a view taken along line 6, 7—6, 7 of FIG. 5.

Referring now specifically to FIGS. 1 and 4-8, FIG. 4 depicts a perspective showing of a second joining key embodiment 22. The joining key 22 has the same generally overall "L" shape of the aforediscussed joining key 20. Joining key 22, unlike joining key 20, is slightly less than or equal in cross-sectional width of the shallow groove 14 and generally conforms thereto. Thus joining key 22 is more easily slideable in the shallow groove 14 and has minimal frictional contact with the shallow groove unlike the joining key 20. The ends 24 of joining key 22 have a reduced cross-sectional dimension relative to the body portion 25 and the opening in the shallow groove 14. At the joinder of the body portion 25 and ends 24 of joining key 22, a substantially "V" shaped indentation 26 is provided. Because of the indentation 26 and the reduced width of the ends 24, the ends 24 may be pivoted upwardly through the opening of shallow groove 14. On the under side of the ends 24, that is the side of the ends 24 opposite the indentation 26, is a protrusion 28. The protrusion 28 is shown as an integral portion of the end 24. The protrusion 28 generally takes a frusto-conic form and reduces in diameter from its end 24 connection toward its distal end 30. In order to facilitate a pressure between the joined side frame members 12, as is hereinafter explained in more detail, the protrusions 28 are either longitudinally bifurcated or quartered as shown in FIGS. 6 and 7 respectfully with spaces therebetween.

Apertures 32 are provided in the bottom or closed surface 18 of the shallow groove to mate with the protrusions 28. The apertures 32 take the same general configuration as the protrusions. The apertures 32 are spaced from the ends of the side frame members 12 a distance slightly greater than the distance between the corner and the protrusion when the joining key 22 is properly located in the shallow groove and the ends of the side frame members 12 are properly abutted. This feature requires that the protrusion be forced along the aperture edge closest to the abutting ends of the side frame members as it is inserted. This creates a caming action which forces the ends to be drawn together in a tight abutting relationship. The protrusions maintain a slight out of alignment relationship with their mating aperture and yet can be inserted fully into the aperture due to the compression of the space or spaces between the bifurcation or quartered sections.

Figure 8:
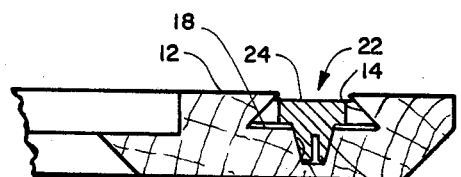
FIG. 8 is a view taken along line 3, 8—3, 8 of FIG. 1.

FIG. 8 shows an end view of the joining key 22 and its relationship with the walls of the shallow groove 14 and protrusion/aperture insertion.

DESCRIPTION OF THE THIRD PREFERRED EMBODIMENT

Figure 4:
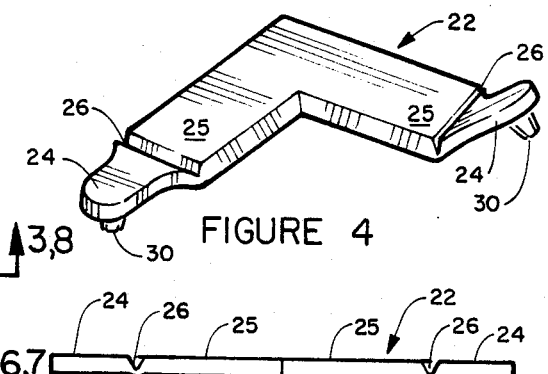
FIG. 4 is a perspective view of a second embodiment of the joining key of the invention.
Figure 5:
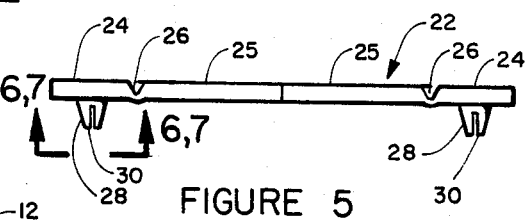
FIG. 5 is a side view of FIG. 4.
Figure 10:
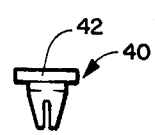
FIG. 10 is an insertable plug member used with the third embodiment of the invention.
Figure 9:
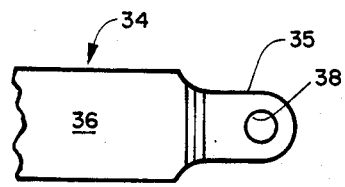
FIG. 9 is an end showing a third embodiment of the joining key of the invention.
Figure 11:
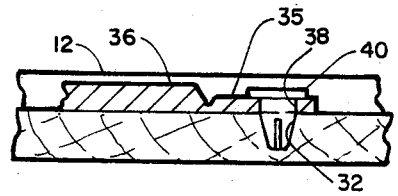
FIG. 11 is a view taken along line 11—11 of FIG. 1.

Referring now specifically to FIGS. 9-11, the joining key 34 is similar to joining keys 20 and 22 in its overall generally "L" shaped configuration. The ends 35 of joining key 32 has a longitudinal reduction of thickness relative to the body portion 36 and includes an aperture 38 therethrough. The cross-sectional dimensions of the joining key 34 can be either the same as shown in FIG. 2 or FIG. 4. However, unlike the showing of FIG. 4, the ends 35 of joining key 34 are not required to pivot out of the shallow groove. When the side frame members 12 are properly positioned, a plug 40, see FIG. 10, is inserted partially through the aperture 38 and into aperture 32 in the same manner and for the same purpose as the protrusion 28 hereinbefore described. Obviously, the plug 40 is retained in aperture 38 by its enlarged crown 42. As shown in FIG. 11, the combined thickness of the end 35 and the crown 42 is substantially the same thickness as the body 36 of the locking member 34. It should be understood that the locking of the abutting side frame members 12 and the pressure therebetween is created by the plug 40 insertion in the same manner as described above under the discussion of the second preferred embodiment.

Figure 12:
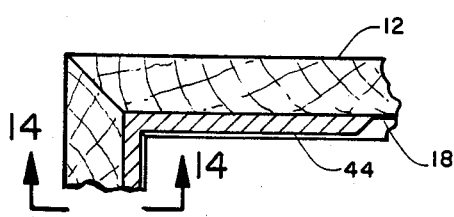
FIG. 12 is a corner section of a second embodiment of a rectangular frame.
Figure 13:
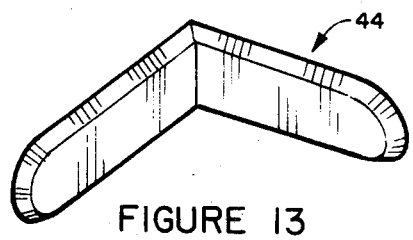
FIG. 13 is a fourth embodiment of a joining key of the invention.
Figure 14:
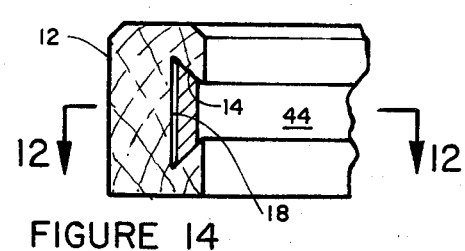
FIG. 14 is a view taken along line 14—14 of FIG. 12.

Referring now to FIGS. 12-14, in FIG. 12 a second embodiment of a frame member is shown having vertical shallow grooves 14, see FIG. 13, rather than horizontal shallow grooves, see FIG. 8. As hereinbefore discussed for the three embodiments, FIG. 13 depicts a vertical oriented joining key 44. The angle between the legs of the joining key 44 and the width or height of all of the joining keys described hereinbefore are substantially the same. It should be understood that the various configured joining keys described under the First, Second and Third preferred embodiments can be employed with the same success in the vertical mode depicted in FIGS. 13 and 14.

Although the invention has been described with reference to materials and embodiments, it will be appreciated that certain variations and modifications will be apparent to those skilled in the art. Accordingly, such modifications and variations are intended within the scope of the appended claims.

What is claimed is:

1. An improved locking joint comprising:
a pair of members aligned in an abutting substantially end-to-end relationship defining a predetermined included angle therebetween, each of said members having at least one end surface projecting from the abutting end thereof to be joined, said members have shallow grooves with an opening extending longitudinally from said abutting end, said shallow grooves in each of said members has at least two recesses positioned centrally along their bottom surface a predetermined distance from said abutting end, at least a portion of said shallow grooves being slightly wider at said bottom surface than at their top opening;
a joining key matringly engaging said shallow grooves, said key having first and second straight arms diverging at said predetermined included angle, said arms being dimensioned to form a tight sliding fit in said corresponding grooves; and
locking means for locking said members in an abutting relationship, said locking means comprises tips pivotally attached to each end of said key, said tips being configured to pivot through said top opening of said shallow grooves, one protrusion extends from each tip toward said bottom surface of said shallow grooves, when said key is installed in said shallow groove of said aligned members said protrusions engage said recess whereby said members are forced together and locked in that condition.

2. The invention as defined in claim 1, wherein said recesses and protrusions are frusto-conic in cross-section.

3. The invention as defined in claim 1 wherein said key tips and protrusions are integrally formed from a resilient material and the pivotal attachment between said key and said tips is a groove in the form of a "V" with the open portion of said "V" facing said top opening of said shallow groove.

4. The invention as defined in claim 3 wherein the sides of said "V" are substantially 45° from a plane perpendicular to the closed end of said "V".

5. The invention as defined in claim 1 wherein said protrusions are positioned from said abutting end a distance slightly less than said predetermined distance of said recesses from said abutting wall whereby the caming action of said protrusions being inserted into said recesses forces said members together at their abutting surfaces and when completely inserted locks said members in a forced together condition.

6. The invention as defined in claim 1 wherein said protrusions are resilient, have a slightly larger diameter than said recesses and are longitudinally bifurcated with a space between said bifurcations whereby when inserted into said recesses said bifurcations are forced together along said space forcing said members together at their abutting surfaces in a locked together condition.

7. The invention as defined in claim 1 wherein said protrusions are resilient, have a slightly larger diameter than said recesses and are sectioned quarterly in a longitudinal direction with a space between each adjacent quarter section whereby when inserted into one of said recess said quarter sections are forced together along said spaces forcing said members together at their abutting surfaces in a locked together condition.

8. An improved locked joint structure comprising:
a pair of members aligned in an abutting substantially end-to-end relationship defining a predetermined included angle therebetween, each of said members having at least one end surface projecting from the abutting end thereof to be joined, said members have shallow grooves with an opening extending longitudinally from said abutting end, at least a portion of said shallow grooves being slightly wider at their bottom surface than at their top opening;
a joining key matringly engaging said shallow grooves, said key having first and second straight arms diverging at said predetermined included angle, said arms being dimensioned to form a tight sliding fit in said corresponding shallow grooves; and
locking means for locking said members in an abutting relationship, said locking means comprises
a key of thin material matringly engaging said corresponding grooves, said key having first and second straight arms diverging at said predetermined included angle, said arms having distal end portions of reduced vertical thickness with at least one aperture there through and dimensioned to form a tight sliding fit in said corresponding grooves, said shallow grooves include at least two recesses positioned centrally along said bottom surface and
a resilient plug member for insertion through said aperture and into one of said recesses when said key is inserted in said shallow groove, said plug member has a crown portion of greater diameter than said aperture, whereby the combined vertical thickness of said crown portion and the distal end portion is no greater than the vertical thickness of said arms, and an end portion for mating with one of said recesses, said members are faced together at their abutting surfaces and locked in that condition.

9. The invention as defined in claim 8 wherein said key and plug are frusto-conic in cross-section.

10. The invention as defined in claim 8 wherein said key and plugs are formed of resilient material.

11. The invention as defined in claim 8 wherein said at least two apertures are positioned from said abutting ends, a distance slightly less than said predetermined distance of recesses from said abutting ends whereby the caming action of said plug being inserted into one of said recesses forces said members together at their abutting surfaces and when completely inserted locks said members in a forced together relationship.

12. The invention as defined in claim 9 wherein the frusto conic end of said plug has a slightly larger tapered diameter than said recesses and is at least longitudinally bifurcated at its frusto conic end with a space between said bifurcations whereby when inserted through said aperture into one of said recesses said bifurcations are forced together along said space forcing said members together at their abutting surfaces in a locked together condition.

13. The invention as defined in claim 8 wherein the frusto conic end of said plug has a slightly larger tapered diameter than said recesses and is sectioned quarterly in a longitudinal direction with a space between each adjacent quarter section whereby when inserted through said aperture into one of said recesses said quarter sections are forced together along said spaces forcing said members together at their abutting surfaces in a locked together condition.

* * * * *